United States Patent
Wang et al.

(10) Patent No.: US 9,190,772 B2
(45) Date of Patent: Nov. 17, 2015

(54) PORTABLE ELECTRONIC DEVICE ASSEMBLY

(71) Applicant: Acer Incorporated, New Taipei (TW)

(72) Inventors: Wei-Cheng Wang, New Taipei (TW); Shao-Chi Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/700,158

(22) Filed: Apr. 30, 2015

(65) Prior Publication Data

US 2015/0236445 A1  Aug. 20, 2015

Related U.S. Application Data

(63) Continuation of application No. 13/969,673, filed on Aug. 19, 2013, now Pat. No. 9,052,869.

(30) Foreign Application Priority Data

Apr. 30, 2013  (TW) .............................. 102115478 A

(51) Int. Cl.
  *H01R 11/00*  (2006.01)
  *H01R 13/62*  (2006.01)
  *H01R 12/71*  (2011.01)
  *G06F 1/16*  (2006.01)

(52) U.S. Cl.
  CPC .......... *H01R 13/6205* (2013.01); *G06F 1/1632* (2013.01); *H01R 12/71* (2013.01)

(58) Field of Classification Search
  CPC ........................ H01R 13/6205; H01R 2201/06
  USPC ............. 361/679.01, 679.02, 679.08, 679.09, 361/679.21, 679.26, 679.29, 679.3, 679.32, 361/679.41, 679.55, 679.56; 439/38–40, 439/59, 131, 135–147, 259, 296, 345, 367
  See application file for complete search history.

(56) References Cited

U.S. PATENT DOCUMENTS 7,331,793 B2 *   2/2008  Hernandez et al. ............. 439/38
7,467,948 B2 *  12/2008  Lindberg et al. ................ 439/38
8,672,228 B1 *   3/2014  Saini ............................. 235/486
8,794,980 B2 *   8/2014  McCormack ................... 439/39

* cited by examiner

*Primary Examiner* — Angel R Estrada
*Assistant Examiner* — Dimary Lopez Cruz
(74) *Attorney, Agent, or Firm* — Jianq Chyun IP Office

(57) ABSTRACT

A portable electronic device assembly includes a portable electronic device and a peripheral device. The portable electronic device includes a first electronic connection element and a first magnetic element. The peripheral device includes a second electronic connection element and a second magnetic element. When the portable electronic device is placed on the peripheral device, the magnetic force between the second magnetic element and the first magnetic element moves the second electronic connection element such that the first electronic connection element and the second electronic connection element are electrically connected.

17 Claims, 4 Drawing Sheets

PORTABLE ELECTRONIC DEVICE ASSEMBLY

CROSS-REFERENCE TO RELATED APPLICATION

This application is a continuation application of and claims the priority benefit of a prior application Ser. No. 13/969,673, filed on Aug. 19, 2013, now pending. The prior application Ser. No. 13/969,673 claims the priority benefit of Taiwan application serial no. 102115478, filed on Apr. 30, 2013. The entirety of each of the above-mentioned patent applications is hereby incorporated by reference herein and made a part of this specification.

FIELD

The exemplary embodiment of the present invention relates to a portable electronic device assembly. More specifically, the exemplary embodiment of the present invention relates to a portable electronic device assembly which could protect the electronic connection element.

BACKGROUND

In order to enhance the convenience when using a portable electronic device such as a tablet, many relative peripheral devices presented on the market provide a supporting function or a keyboard inputting function. Between the tablet and the peripheral device, connectors or wireless transmitting could be used as the medium of data transmission. If a connector is chosen to be used for transmitting data, it has to be especially noted that 1. the connector must have a good contact; 2. the connector may break when connecting to the tablet.

However, the peripheral devices on the market now mostly have connectors disposed fixedly at the connecting point of the peripheral device and the tablet, and the connectors are mostly exposed to the outside of the device. If the peripheral device is not connected with the tablet, it may easily touch other objects, and when the peripheral device is connected with the tablet, it may be easily broken.

Therefore, a peripheral device and a portable electronic device using the portable electronic device are needed to solve the disadvantages of the prior arts.

SUMMARY

The main object of the present invention is to provide a peripheral device which has an effect of protecting the electronic connection element.

Another object of the present invention is to provide a portable electronic device assembly which has an effect of protecting the electronic connection element.

In order to achieve the aforementioned object, according to one embodiment of the present invention, the peripheral device of the present invention is used with a portable electronic device; the portable electronic device includes a first electronic connection element and a first magnetic element. The peripheral device comprises a retaining portion, a base portion and a supporting portion. The retaining portion is used for placing the portable electronic device therein. A second electronic connection element, a circuit board, a second magnetic element and a third magnetic element are disposed in the base portion, the second electronic connection element is electrically connected with the circuit board, and the second magnetic element is disposed on the circuit board. One end of the supporting portion is connected with the base portion, another end of the supporting portion is connected with the retaining portion, and the supporting portion is used for supporting the retaining portion such that the retaining portion can be stood on the base portion. When the portable electronic device is not placed on the retaining portion, by the third magnetic element attracting the second magnetic element, the circuit board and the second electronic connection element are fixed inside the base portion, and when the portable electronic device is placed on the retaining portion, by the first magnetic element attracting the second magnetic element, the circuit board is moved and thereby makes the first electronic connection element electrically connected to the second electronic connection element.

According to one embodiment of the present invention, the portable electronic device assembly comprises a portable electronic device and a peripheral device. The portable electronic device of the present invention includes a first electronic connection element and a first magnetic element. The peripheral device comprises a retaining portion, a base portion and a supporting portion. The retaining portion is used for placing the portable electronic device therein. A second electronic connection element, a circuit board, a second magnetic element and a third magnetic element are disposed in the base portion, the second electronic connection element is electrically connected with the circuit board, and the second magnetic element is disposed on the circuit board. One end of the supporting portion is connected with the base portion, another end of the supporting portion is connected with the retaining portion, and the supporting portion is used for supporting the retaining portion such that the retaining portion can be stood on the base portion. When the portable electronic device is not placed on the retaining portion, by the third magnetic element attracting the second magnetic element, the circuit board and the second electronic connection element are fixed inside the base portion, and when the portable electronic device is placed on the retaining portion, by the first magnetic element attracting the second magnetic element, the circuit board is moved and thereby makes the first electronic connection element electrically connected to the second electronic connection element.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

For facilitating understanding and clarifying the object, characteristics and advantages of the present invention, following specific embodiments and figures of the present invention are presented as a detailed description.

Figure 1A:
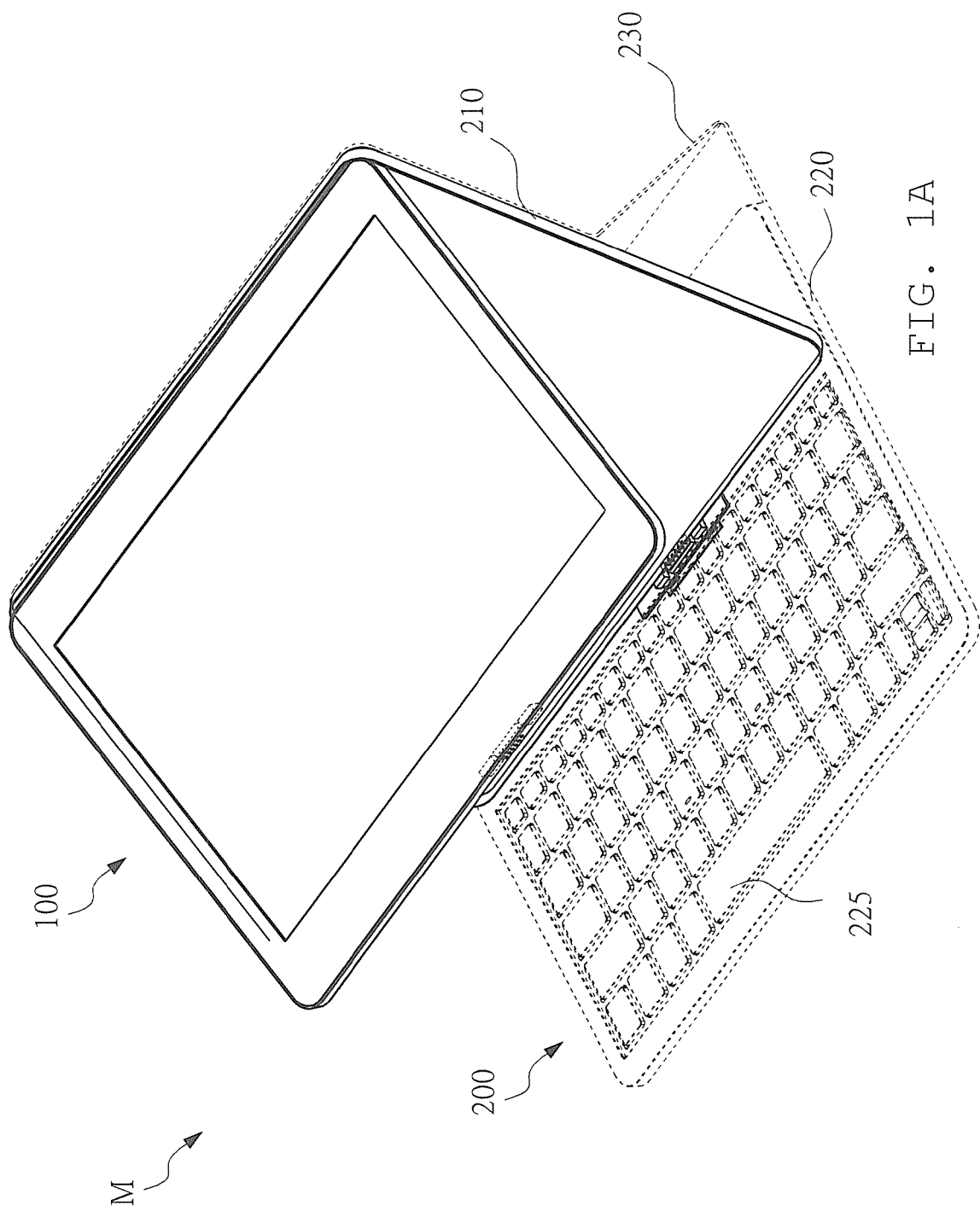
FIGS. 1A and 1B are schematic diagrams of one embodiment of the portable electronic device assembly in accordance with the present invention.
Figure 1B:
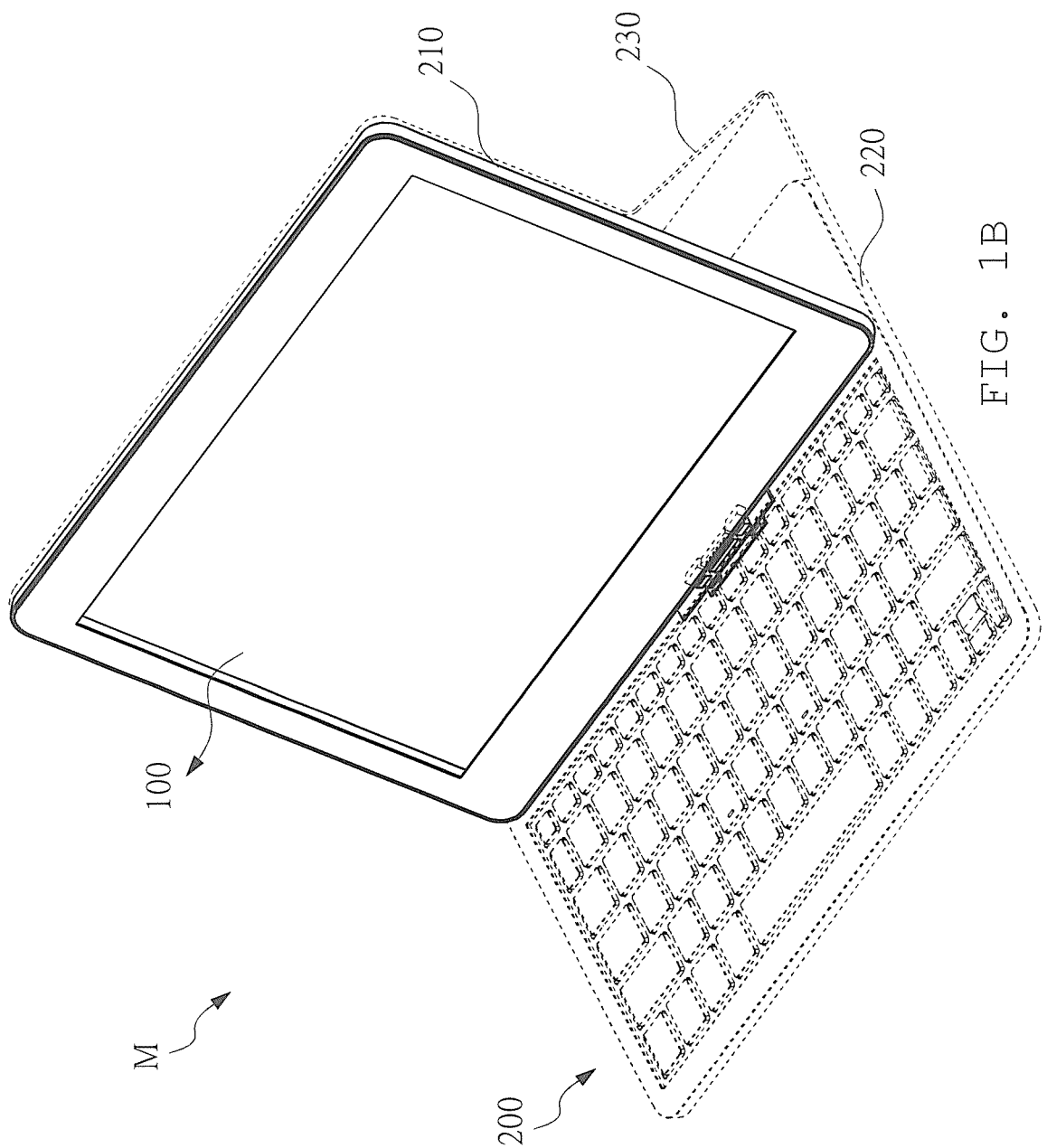

For the following, please refer to FIG. 1A, FIG. 1B, FIG. 2, FIG. 3A and FIG. 3B together, which are schematic diagrams of one embodiment of the portable electronic device assembly in accordance with the present invention. As shown in FIG. 1A and FIG. 1B, according to one embodiment of the present invention, the portable electronic device assembly M comprises a portable electronic device 100 and a peripheral device 200. The peripheral device 200 is used for placing the portable electronic device 100 thereon; thus the user can easily view the screen of the portable electronic device 100. According to one embodiment of the present invention, the portable electronic device 100 could be a tablet, but the present invention is not limited within the above example; the portable electronic device 100 could also be a multimedia player such as an MP3 player or an MP4 player, a mobile phone, a PDA, a handheld game console or an e-book reader.

According to one embodiment of the present invention, as shown in FIG. 1A and FIG. 1B, the peripheral device 200 comprises a retaining portion 210, a base portion 220 and a supporting portion 230. The retaining portion 210 is a frame-shape body, and the shape and the size of the frame body are substantially matched with the shape of the portable electronic device 100 such that the portable electronic device 100 can be placed thereon. The base portion 220 is provided for placing the retaining portion 210 thereon. One end of the supporting portion 230 is connected with the base portion 220, and another end of the supporting portion 230 is connected with the retaining portion 210. The supporting portion 230 is used for supporting the retaining portion 210 such that the retaining portion 210 can be stood on the base portion 220. A keyboard 225 is disposed on a surface of the base portion 220, as shown in FIG. 1B; when the portable electronic device 100 is placed on the retaining portion 210, a viewing angle is thus formed, and the user can watch the screen of the portable electronic device 100 and use the keyboard 225 at the same time.

Figure 2:
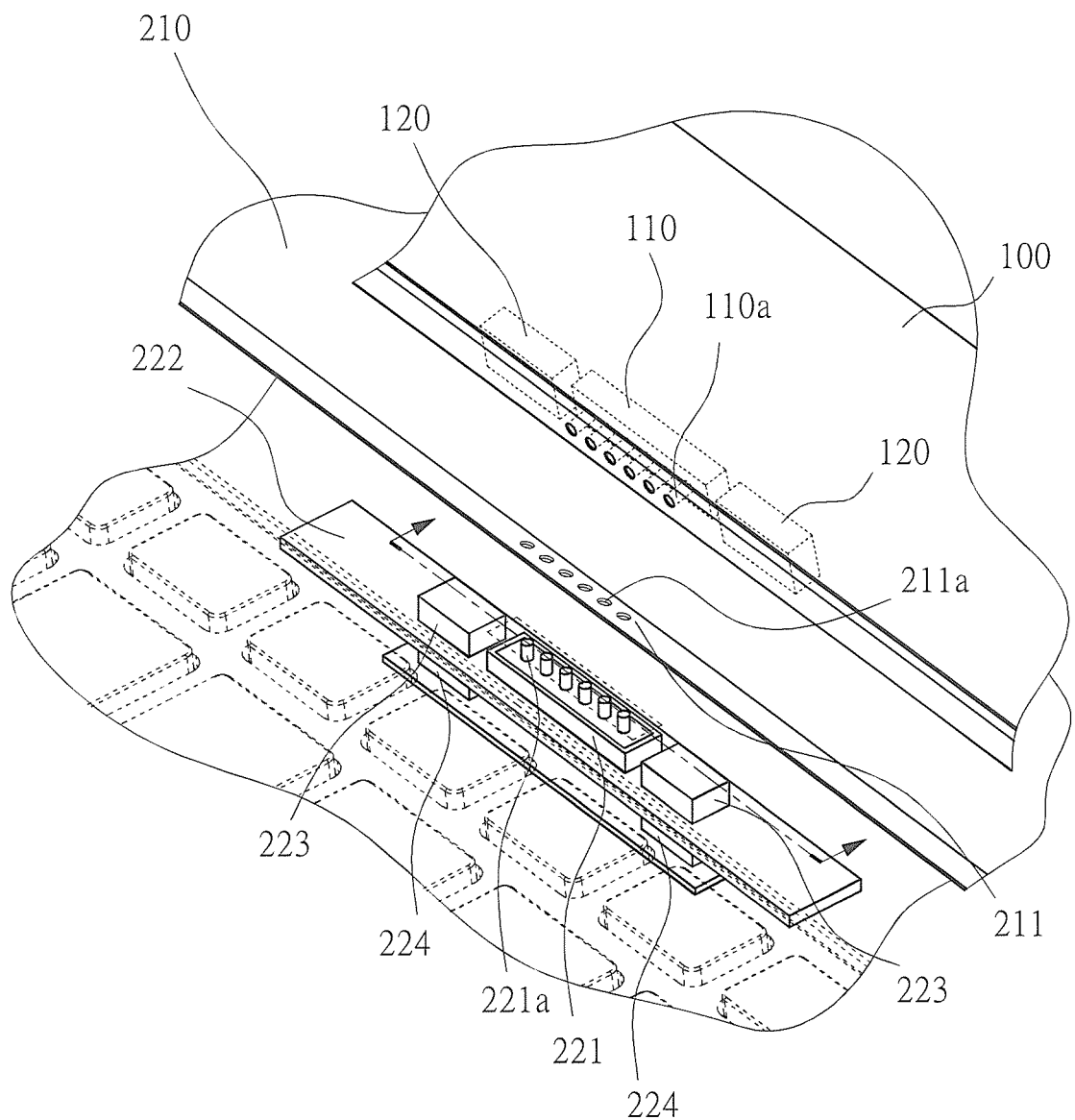
FIG. 2 is an enlarged diagram of one embodiment of the portable electronic device assembly in accordance with the present invention.

According to one embodiment of the present invention, as shown in FIG. 2, the portable electronic device 100 includes a first electronic connection element 110 and a first magnetic element 120, and disposed in the base portion 220 are a second electronic connection element 221, a circuit board 222, a second magnetic element 223 and a third magnetic element 224. The second electronic connection element 221 is electrically connected with the circuit board 222, and the second magnetic element 223 is disposed on the circuit board 222.

Figure 3A:
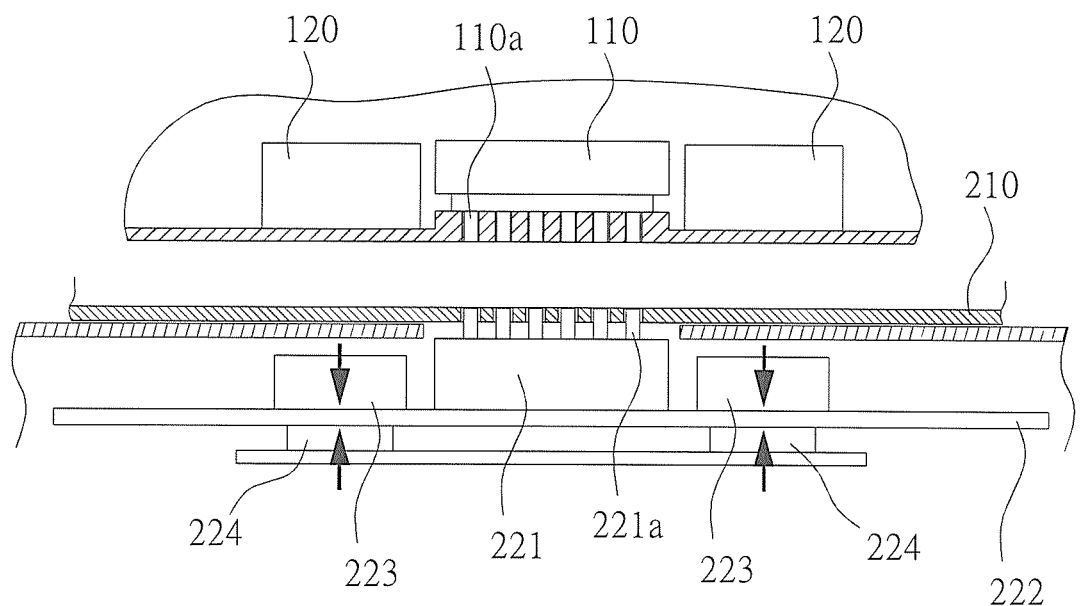
FIGS. 3A and 3B are schematic diagrams of one embodiment of connecting the portable electronic device and the peripheral device in accordance with the present invention.

According to one embodiment of the present invention, as shown in FIG. 1A, FIG. 2 and FIG. 3A, when the portable electronic device 100 is not placed on the retaining portion 210, by the third magnetic element 224 attracting the second magnetic element 223, the circuit board 222 and the second electronic connection element 221 are fixed inside the base portion 220. At this time, the second electronic connection element 221 will not protrude from the surface of the base portion 220, and thus the effect of protecting the second electronic connection element 221 can be achieved. In addition, according to one embodiment of the present invention, the third magnetic element 224 can also be replaced by a metal sheet to achieve a similar effect.

According to one embodiment of the present invention, the attracting force of the first magnetic element 120 toward the second magnetic element 223 must be higher than the attracting force of the third magnetic element 224 toward the second magnetic element 223. Thus, as shown in FIG. 1B, FIG. 2 and FIG. 3B, when the portable electronic device 100 is placed in the retaining portion 210, by the first magnetic element 120 attracting the second magnetic element 223, the circuit board 222 is moved upwardly and thereby makes the first electronic connection element 110 electrically connected to the second electronic connection element 221, and thus the portable electronic device 100 can use the power of the peripheral device 200 for operating.

Figure 3B:
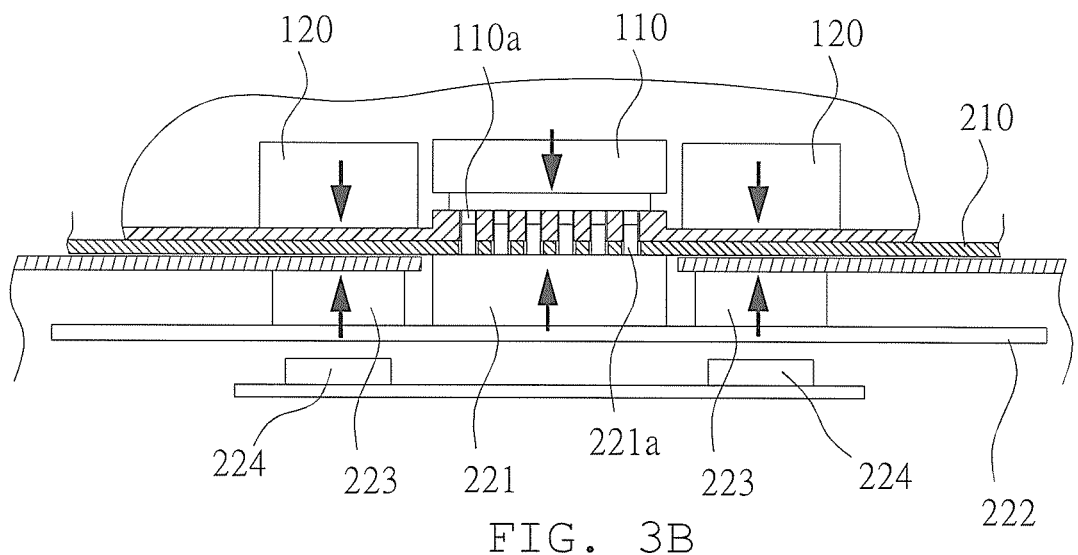

According to one embodiment of the present invention, as shown in FIG. 2, FIG. 3A and FIG. 3B, the first electronic connection element 110 comprises a plurality of metal contacts 110a, and the second electronic connection element 221 comprises a plurality of metal elastic pieces 221a. Furthermore, the retaining portion 210 comprises a connecting portion 211, and the position of the connecting portion 211 is corresponded to the position of the second electronic connection element 221. The connecting portion 211 comprises a plurality of connecting holes 211a.

As shown in FIG. 1A, FIG. 2 and FIG. 3A, when the portable electronic device 100 is not placed on the retaining portion 210, the second electronic connection element 221 (the plurality of metal elastic pieces 221a) is hidden under the connecting portion 211. In addition, as shown in FIG. 1B, FIG. 2 and FIG. 3B, when the portable electronic device 100 is placed on the retaining portion 210, the second electronic connection element 221 (the plurality of metal elastic pieces 221a) protrudes from the connecting portion 211 and thus electrically connects to the first electronic connection element 110 (the plurality of metal contacts 110a).

In summary, regardless of the function, the way and result of the present invention are shown to have technical characteristics different from those of the prior arts. However, the aforementioned embodiments are just for illustrating the principle and the result of the present invention and are not intended to limit the range of the present invention. It will be obvious to those skilled in the art that changes and modifications may be made without departing from this invention and its broader aspects. Therefore, the appended claims are intended to encompass within their scope all such changes and modifications as are within the true spirit and scope of the exemplary embodiment of the present invention.

What is claimed is:

1. A connector assembly used in a peripheral device, comprising:
   a circuit board, movably disposed in the peripheral device;
   an electronic connection element, disposed on the circuit board, electrically connected to and moved along with the circuit board;
   a first driving element, disposed at the circuit board,
   wherein the circuit board is driven to move toward a surface of the peripheral device by a first non-contact force applied to the first driving element, and terminals of the electronic connection element are protruded out of the peripheral device from the surface,
   wherein the circuit board moves backward the surface of the peripheral device when the first non-contact force is withdrawn, and the terminals of the electronic connection element are hidden in the peripheral device.

2. The connector assembly as claimed in claim 1, further comprising:
   a second driving element, disposed in the peripheral device and located at a side opposite to the surface relative to the circuit board,
   wherein a second non-contact force is generated between the first and the second driving elements, and the first non-contact force is greater than the second non-contact force.

3. The connector assembly as claimed in claim 2, wherein the first driving element is a magnet and the second driving element is a magnetism conductive element, or the first driving element is a magnetism conductive element and the second driving element is a magnet.

4. The connector assembly as claimed in claim 1, wherein the peripheral device comprises a base portion and a retaining portion placed thereon,
wherein the connector assembly is disposed in the base portion, the retaining portion has the surface, and a portable electronic device is suited for being placed on the retaining portion to provide the first non-contact force, such that the peripheral device is electrically connected to the portable electronic device through the connector assembly.

5. The connector assembly as claimed in claim 4, wherein the retaining portion comprises a connecting portion having the surface, and the position of the connecting portion is corresponded to the position of the electronic connection element,
wherein the electronic connection element is hidden under the connecting portion when the portable electronic device is not placed on the retaining portion, and the terminals of the electronic connection element protrude from the connecting portion and thus electrically connect to the first electronic connection element when the portable electronic device is placed on the retaining portion.

6. The connector assembly as claimed in claim 5, wherein the connecting portion comprises a plurality of connecting holes corresponding to the terminals of the electronic connection element, and the connecting holes connect the surface and an interior of the base portion when the retaining portion stands on the base portion and the portable electronic device is placed on the retaining portion.

7. The connector assembly as claimed in claim 1, wherein the terminals are a plurality of metal elastic pieces.

8. A portable electronic device assembly, comprising:
a portable electronic device, including a first electronic connection element and at least one first driving element; and
a peripheral device, comprising:
a circuit board, movably disposed in the peripheral device;
a second electronic connection element, disposed on the circuit board, electrically connected to and moved along with the circuit board;
at least one second driving element, disposed at the circuit board,
wherein, when the portable electronic device is placed on the peripheral device, a first non-contact force is generated between the first driving element and the second driving element, and the circuit board is driven to move such that the second electronic connection element protrudes and electrically connects to the first electronic connection element,
wherein, when the portable electronic device is released from the peripheral device, the first non-contact force is withdrawn and the second electronic connection element is hidden in the peripheral device.

9. The portable electronic device assembly as claimed in claim 8, further comprising:
a third driving element, disposed in the peripheral device and located at a side opposite to the portable electronic device relative to the circuit board,
wherein a second non-contact force is generated between the second and the third driving elements, and the first non-contact force is greater than the second non-contact force.

10. The portable electronic device assembly as claimed in claim 9, wherein the first driving element is a magnet and the second driving element is a magnetism conductive element, or the first driving element is a magnetism conductive element and the second driving element is a magnet.

11. The portable electronic device assembly as claimed in claim 9, wherein the second driving element is a magnet and the third driving element is a magnetism conductive element, or the second driving element is a magnetism conductive element and the third driving element is a magnet.

12. The portable electronic device assembly as claimed in claim 8, wherein the peripheral device comprises a base portion and a retaining portion placed thereon,
wherein the circuit board, the second electronic connection element, and the second driving element are disposed in the base portion,
wherein the portable electronic device is placed on the retaining portion to provide the first non-contact force.

13. The portable electronic device assembly as claimed in claim 12, wherein the retaining portion comprises a connecting portion, and the position of the connecting portion is corresponded to the position of the second electronic connection element,
wherein the second electronic connection element is hidden under the connecting portion when the portable electronic device is not placed on the retaining portion, and the terminals of the electronic connection element protrude from the connecting portion and thus electrically connect to the first electronic connection element when the portable electronic device is placed on the retaining portion.

14. The portable electronic device assembly as claimed in claim 13, wherein the connecting portion comprises a plurality of connecting holes corresponding to the terminals of the first and the second electronic connection elements when the retaining portion stands on the base portion and the portable electronic device is placed on the retaining portion.

15. The portable electronic device assembly as claimed in claim 12, wherein the peripheral device further comprises a support portion, one end of the supporting portion is connected with the base portion, another end of the supporting portion is connected with the retaining portion, and the supporting portion is used for supporting the retaining portion such that the retaining portion can be stood on the base portion.

16. The portable electronic device assembly as claimed in claim 12, wherein a keyboard is disposed on a surface of the base portion.

17. The portable electronic device assembly as claimed in claim 8, wherein the first electronic connection element comprises a plurality of metal contacts and the second electronic connection element comprises a plurality of metal elastic pieces.

* * * * *